(12) United States Patent
Becherer

(10) Patent No.: US 9,477,748 B2
(45) Date of Patent: Oct. 25, 2016

(54) FILTER SELECTION IN SEARCH ENVIRONMENTS

(71) Applicant: Adobe Systems Incorporated, San Jose, CA (US)

(72) Inventor: Nico Becherer, Hamburg (DE)

(73) Assignee: Adobe Systems Incorporated, San Jose, CA (US)

( * ) Notice: Subject to any disclaimer, the term of this patent is extended or adjusted under 35 U.S.C. 154(b) by 166 days.

(21) Appl. No.: 14/136,920

(22) Filed: Dec. 20, 2013

(65) Prior Publication Data

US 2015/0178381 A1    Jun. 25, 2015

(51) Int. Cl.
*G06F 17/30* (2006.01)

(52) U.S. Cl.
CPC ... *G06F 17/30699* (2013.01); *G06F 17/30867* (2013.01); *G06F 17/30327* (2013.01); *G06F 17/30864* (2013.01)

(58) Field of Classification Search
CPC .................. G06F 17/30327; G06F 17/30699; G06F 17/30867
USPC ................. 707/711, 722, 732, 718, 748, 754
See application file for complete search history.

(56) References Cited

U.S. PATENT DOCUMENTS

| | | | |
|---|---|---|---|
| 5,867,799 A * | 2/1999 | Lang et al. | |
| 6,314,420 B1 * | 11/2001 | Lang et al. | |
| 6,775,664 B2 * | 8/2004 | Lang et al. | 707/999.001 |
| 7,133,660 B2 * | 11/2006 | Irlam et al. | 455/403 |
| 7,788,270 B2 * | 8/2010 | Bernard | 707/754 |
| 7,809,185 B2 * | 10/2010 | Li | G06K 9/4652 382/155 |
| 7,996,369 B2 * | 8/2011 | Li et al. | 707/673 |
| 8,055,653 B2 * | 11/2011 | Liu et al. | 707/718 |
| 8,082,583 B1 * | 12/2011 | Kodukula et al. | 726/22 |
| 8,250,080 B1 * | 8/2012 | Guha et al. | 707/754 |
| 8,472,757 B2 * | 6/2013 | Shiiyama et al. | 382/305 |
| 8,533,206 B1 * | 9/2013 | Guha et al. | 707/754 |
| 8,612,467 B2 * | 12/2013 | Bernard | 707/760 |
| 8,699,826 B2 * | 4/2014 | Remedios | G06F 17/3025 382/162 |
| 8,799,239 B2 * | 8/2014 | Luukkala et al. | 707/693 |
| 8,938,474 B2 * | 1/2015 | Brooks et al. | 707/783 |
| 2002/0120609 A1 * | 8/2002 | Lang et al. | 707/1 |
| 2004/0215657 A1 * | 10/2004 | Drucker | G06F 17/3002 |
| 2005/0219929 A1 * | 10/2005 | Navas | 365/212 |
| 2006/0026133 A1 * | 2/2006 | Ahmed | 707/3 |
| 2006/0224993 A1 * | 10/2006 | Wong | G06F 17/30274 715/800 |
| 2006/0253491 A1 * | 11/2006 | Gokturk | G06F 17/30256 |
| 2008/0063267 A1 * | 3/2008 | Cieplinski | G06F 17/3025 382/165 |
| 2008/0071744 A1 * | 3/2008 | Yom-Tov | 707/3 |

(Continued)

*Primary Examiner* — Frantz Coby
(74) *Attorney, Agent, or Firm* — Kilpatrick Townsend & Stockton LLP

(57) ABSTRACT

Techniques for utilizing sets of filters to reduce a large number of searchable assets to a meaningful or reduced number of searchable assets. Feature information may be extracted from a particular asset of a set of training assets to create an artificial term. A reduction ratio may then be calculated by utilizing the created artificial term to filter the set of training assets. The reduction ratio may represent the ratio of training assets that contain a particular artificial term. A plurality of filters and their associated reduction ratios may be created this way by utilizing the set of training assets. This process can also involve receiving a requested reduction ratio associated with a set of searchable assets. A combination of filters may then be selected which, when applied to the set of searchable assets, results in a reduced number of searchable assets according to the requested reduction ratio.

17 Claims, 7 Drawing Sheets
(3 of 7 Drawing Sheet(s) Filed in Color)

(56) References Cited

U.S. PATENT DOCUMENTS

| | | | |
|---|---|---|---|
| 2008/0077569 A1* | 3/2008 | Lee | G06F 17/30713 |
| 2008/0301128 A1* | 12/2008 | Gandert | G06F 17/30265 |
| 2008/0313142 A1* | 12/2008 | Wang | G06F 17/3064 |
| 2009/0234909 A1* | 9/2009 | Strandell et al. | 709/203 |
| 2009/0307187 A1* | 12/2009 | Averbuch et al. | 707/2 |
| 2010/0064254 A1* | 3/2010 | Atsmon | G06Q 30/0603 715/810 |
| 2010/0082619 A1* | 4/2010 | Seager et al. | 707/732 |
| 2011/0004831 A1* | 1/2011 | Steinberg et al. | 715/753 |
| 2012/0166450 A1* | 6/2012 | Choi et al. | 707/748 |
| 2012/0254147 A1* | 10/2012 | Bennett | 707/706 |
| 2012/0284258 A1* | 11/2012 | Liu | 707/722 |
| 2014/0337925 A1* | 11/2014 | Marshall et al. | 726/4 |
| 2015/0039473 A1* | 2/2015 | Hu et al. | 705/26.62 |
| 2015/0088854 A1* | 3/2015 | Brooks et al. | 707/711 |

* cited by examiner

FILTER SELECTION IN SEARCH ENVIRONMENTS

TECHNICAL FIELD

This disclosure relates generally to computer-implemented methods and systems for filtering search engine result sets.

BACKGROUND

Modern knowledge seekers and other users use search engines to search for information and media assets. Search engines allow a user to efficiently access a vast source of information on various subjects, for example, by accessing information on the Internet and from other electronic sources. Searching for such content can involve an iterative process of the user entering search query criteria and browsing through search results. Users searching for electronic content generally desire result sets that are accurate and that can be provided quickly following the user's submission of search query criteria. Thus, hosts or providers of search engines generally attempt to reduce search time and increase the accuracy of the search results returned relative to the submitted search query criteria. It is desirable to improve the performance of the search, the management of the result set in terms of size and content, and/or the organization of the search results for presentation. Improving such processing is becoming both more difficult and more important as the quantity and type of available electronic content continues to rapidly grow with the advent of cloud technologies, improvements in storage efficiencies, and other advances in technology.

Existing search algorithms employed by search engines have various deficiencies. For example, techniques for identifying a search result set of an appropriate size to facilitate efficient searching, improve search result organization, and provide other benefits do not adequately account for the expanding amount of available electronic content. Such algorithms generally have sub-linear complexity, meaning they provide solutions without analyzing all available input. Using an algorithm with sub-linear complexity has been considered desirable to keep up with the pace of increasing assets because to process large data sets in more than linear time is too expensive and slow. Other search techniques have involved the use of hierarchical clustering or other hierarchical organizations of electronic content items. However, use of hierarchical organization can also have disadvantages. A common disadvantage of hierarchical organization is that the resulting structure needs to be rebuilt when it becomes unbalanced and is hard to distribute over multiple machines. Generally, it is desirable to improve current techniques for reducing the search time associated with a query in a search engine and reducing the result set of said query to a meaningful subset.

SUMMARY

One embodiment involves identifying filter reduction ratios for a plurality of filters, each respective filter reduction ratio corresponding to a respective reduction of training assets based on use of a respective filter. The embodiment further involves receiving a requested reduction ratio and selecting a subset of filters from the plurality of filters based at least in part on the requested reduction ratio and the filter reduction ratios. The subset of filters is selected such that applying the subset of filters to a set of a number of media assets reduces the number of media assets in the set according to the requested reduction ratio.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

The patent or application file contains at least one drawing executed in color. Copies of this patent or patent application publication with color drawings will be provided by the Office upon request and payment of any necessary fee.

These and other features, embodiments, and advantages of the present disclosure are better understood when the following Detailed Description is read with reference to the accompanying drawings.

DETAILED DESCRIPTION

Introduction

Figure 1:
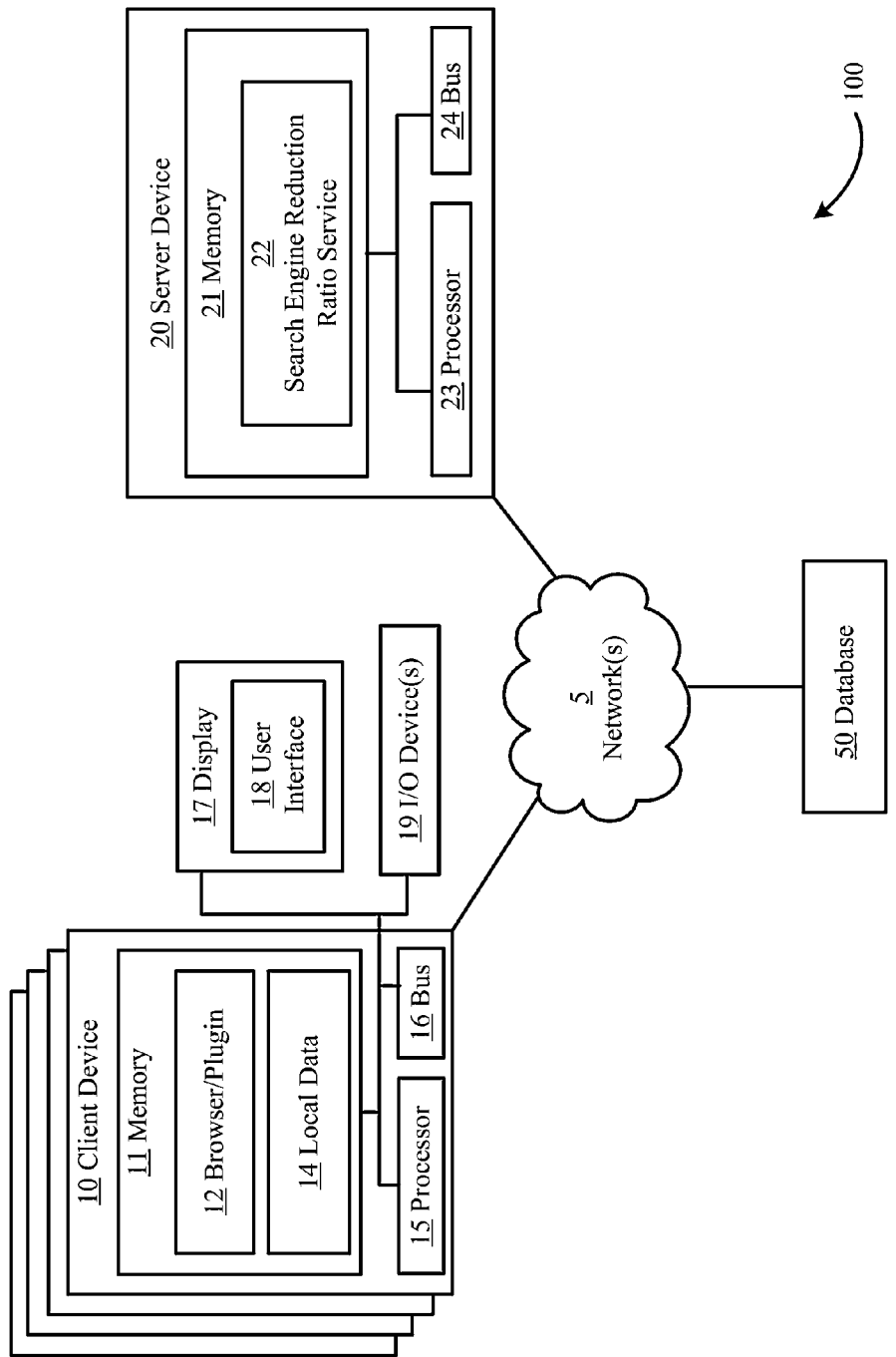
FIG. 1 is a block diagram depicting exemplary computing devices in an exemplary computing environment for implementing certain embodiments.

Various embodiments of the present invention are described hereinafter with reference to the figures. It should be noted that the figures are only intended to facilitate the description of specific embodiments of the invention. They are not intended as an exhaustive description of the invention or as a limitation on the scope of the invention. In addition, an aspect described in conjunction with a particular embodiment of the present invention is not necessarily limited to that embodiment and may be practiced in other embodiments. For instance, though examples are described herein related to image assets, the reduction ratio filter creation and selection service may be used in conjunction with any suitable searchable asset.

Computer-implemented systems and methods are disclosed for utilizing sets of filters to reduce a large number of searchable assets to a meaningful or reduced number of searchable assets. For example, it may be desirable to reduce a collection of 1 million media assets to a reduced set of only 1 thousand media assets by selecting appropriate filters. The reduced set can include only media assets that satisfy each filter. Thus, if the filters comprise three terms the reduced set may include only media assets that include all three terms.

Similarly, if the filters comprise certain image characteristics, the reduced set may include only images having those certain image characteristics.

Filters can be selected to achieve a requested reduction ratio. In the above example, a requested reduction ratio may identify that it is desirable to reduce the number of the collection of media assets by a specified percentage, ratio (e.g., of pre-reduction size to post-reduction size), to a specified size. Selecting multiple filters to be used together to achieve a requested reduction ratio can involve determining information regarding the expected reduction that each filter will provide. How much each filter can be expected to reduce the size of a collection of media assets can be determined based on the use of the filter to reduce training media assets that are generally representative of the collection of media assets. Filter reduction ratios for a plurality of filters can be identified using such training assets where each respective filter reduction ratio corresponds to a respective reduction of training assets based on use of a respective filter. For example, if a filter requires a particular color to be present, it can be observed by application of the filter on training image assets, that only 5% of the training image assets have that particular color. The filter's reduction ratio of 0.05 thus represents this reduction and the expectation that application of the filter to a corresponding larger set of image assets will reduce the size of that larger set by a similar ratio. The filter reduction ratios of multiple filters can be used together to predict how much the filters when combined, i.e., used together, will reduce an image asset set, i.e., will provide a combined reduction ratio. The applicability of the filters depends on the assumption that the filters are statistically independent.

Techniques for reducing a large number of searchable assets to a meaningful or reduced number of searchable assets can be applied to different types of electronic media assets including but not limited to a text file, an image file, an audio file, a movie file, or any suitable digital media file. Such assets can be filtered using various types of filters. For example, some assets such as text files, web pages, and documents can be filtered using text filters.

As used herein the phrase "artificial term" refers to a filter that employs non-text filtering criteria. Artificial terms may be created based at least in part on extracted feature information from one or more exemplary assets. Artificial terms can be analogized to a text term that is used to filter through a set of documents for that particular text term. For example, one may wish to search through a set of documents for documents which contain the word "animal." Only documents which contained the word "animal" would be included in a significant result set. Analogously an artificial term can describe one or more attributes that may be a part of a piece of electronic content such as an image. The artificial term can be used to filter a set of such pieces of electronic content in that only those that have the artificial term features will be included in the filter result set. In one example, an artificial term is identified based on one or more extracted features of a particular training asset from a set of one or more training assets. A set of training assets can include suitable media files as described above with regard to searchable assets. In one example, the training asset may be an image. One or more dominant colors included within the image may be extracted and assigned to an artificial term created by utilizing a color histogram. An artificial term can be a unique value, such as an alpha numeric character, or any suitable alpha numeric string.

As used herein the term "dominant color" refers to a color that is more prevalent than at least one other color in a particular image. One or more of the most prevalent colors can be identified as the dominant colors of the image.

A filter reduction ratio may be calculated for an artificial term by filtering a set of training assets using the artificial term to determine the frequency of inclusion of the artificial term in the set of training assets. In accordance with at least one embodiment, the filter reduction ratio represents the proportion of training assets that contain the artificial term as compared to the proportion of training assets that do not contain the artificial term.

Filter reduction ratios can be used in various circumstances to reduce a large number of searchable assets to a meaningful or reduced number of searchable assets. In one exemplary context, reduction ratios are used to provide a manually-specified or automatically determined reduction in search results provided by a search engine. For example, an administrator may request a particular reduction ratio to be applied to one or more searches to be performed by a search engine. The reduction ratio may represent a desired ratio of searchable assets returned in response to a search query of assets that is less than the entire possible set of searchable assets. Search queries performed can then utilize the requested reduction ratio in identifying appropriate results. Specifically, appropriate filters can be selected so that the number of search results are reduced according to the requested reduction ratio. A subset of filters, described above, are selected for each search and applied to the set of searchable assets to produce the desired reduction ratio. The selection of the type of filters to utilize, e.g., artificial terms created from image training assets for image searches or artificial terms created from a frequency histogram for audio training assets for audio media searches, can be based on the search criteria submitted for a search. As a specific example, a search may request search results similar to a particular image, i.e., the particular image provides the search query criteria. The filters selected can be filters, e.g., artificial terms, selected based on the colors of the image and the requested reduction ratio. As a specific example, depending upon a requested reduction ratio, two, three, four, etc. artificial terms may be selected as filters.

In one example, determining the subset of filters to apply to the set of searchable assets involves a brute force approach. The brute force approach may involve calculating a reduction ratio from the systematic combination of the created filters described above. Multiple (or even all) possible combinations of the filters are scored based on how close the calculated combined reduction ratio is to the desired requested reduction ratio. For example, if we assume that the requested reduction ratio is 0.0002, the combination of Filter A (0.01) and Filter B (0.03) would result in a reduction ratio of 0.0003. The score assigned to the combination of Filter A and B would be higher than the score for a combination of Filter C (0.02) and Filter D (0.04) as Filter A and B's reduction ratio of 0.0003 is closer to the requested reduction ratio of 0.0002 than Filter C and D's reduction ratio of 0.0008. In another example, the combination of Filter A and Filter B could be performed utilizing an OR operation resulting in a reduction ratio of 0.04 (0.01+0.03).

In accordance with at least one embodiment, an overlap threshold can reduce the possible combinations of filters. In an example, an artificial term's associated dominant colors may overlap with another artificial term's associated dominant colors. In accordance with at least one embodiment, if two artificial terms' dominant colors contain a significant amount of overlap, then the combination of the two artificial terms can be excluded as a possibility during selection of filters. For example, you could compare two dominant colors to determine an amount of overlap and compare the overlap to a threshold, and if the threshold is exceeded than exclude the use of the two corresponding artificial terms. In accordance with at least one embodiment, an overlap threshold may be received or specified via a user friendly GUI or application.

Filters may be combined using a hierarchical tree associated with Boolean operations. For example, the utilization of Boolean operations during selection of filter combinations can result in a finer granularity, resulting in a combination of filters that is closer to the requested reduction ratio. In some examples, filters may be selected for combination by utilizing a hierarchical tree of Boolean operations or a hierarchical filter combination algorithm. For example, it may be appropriate to add reduction ratios using an OR Boolean operation. It may also be appropriate to select filters by multiplying reduction ratios using an AND Boolean operation. In accordance with at least one embodiment, a search engine provider may set a threshold or maximum count of possible filter combinations to accept and apply to achieve the desired reduction ratio. For example, if 500 filters exist for a training set, 60 combinations of filters may exist which contain reduction ratios close to the requested reduction ratio. In the given example, a search engine provider may have an internal limit of how many filters to utilize according to the search environment implemented.

Referring now to the drawings, FIG. 1 is a block diagram depicting exemplary computing devices 10 and 20 in an exemplary computing environment 100 for implementing certain embodiments. Other configurations may also be used. In FIG. 1, device 10 is a computing device configured for receiving and communicating requested reduction ratios and displaying results of a search query that have been reduced by said reduction ratio via a user friendly GUI or application displayed via browser/plugin 12 via execution of search engine reduction ratio service application 22. The browser/plugin or separate application that displays the results of reduced result set may be provided as one or more Hyper Text Markup Language (HTML) files, eXtensible Markup Language (XML) files, Javascript files, SWF files of Microsoft Silverlight, Adobe Flash or other compatible rich Internet application files, or files having any other format or combination of formats. The computing device may comprise a web browser with a plugin media player that provides an application framework for executing a compatible rich Internet application stored and configured to run server device 20 and search engine reduction ratio service 22. The browser/plugin or separate application 12 may request and/or receive information from the search engine reduction ratio service application 22 on server device 20 which may in turn access the information stored on a local database (not pictured) or elsewhere such as an external third party database 50.

The exemplary client device 10 may include local data 14 used by the search engine reduction ratio service application 22. Such information may be available and used, for example, when a user (not pictured) saves preferred reduction ratios and overlap thresholds on the client device 10 or user preferences. The user preferences can in some embodiments be communicated to the search engine reduction ratio service application 22 and saved in an associated data store or database of server device 20. In some examples, the communication of the user preferences to the server device 20 and ultimately to the search engine reduction ratio service 22 can be aided via a graphical user interface such as 18 or a web browser such as 12. The database 50 can provide a central repository for information about one or more training asset sets or searchable asset sets. The service device 20 may have a local database which may also store filters created from a set of training assets and previously calculated reduction ratios associated with said filters (not shown).

The exemplary devices illustrated in FIG. 1 provide an example configuration in which the exemplary search engine reduction ratio service can be provided. Other configurations may be used with modifications, additions, and deletions to address the particular circumstances in which a particular system is used.

Embodiments disclosed herein provide various features that facilitate utilizing sets of filters to reduce a large number of searchable assets to a meaningful or reduced number of searchable assets. The following examples illustrate some of these features.

Figure 2:
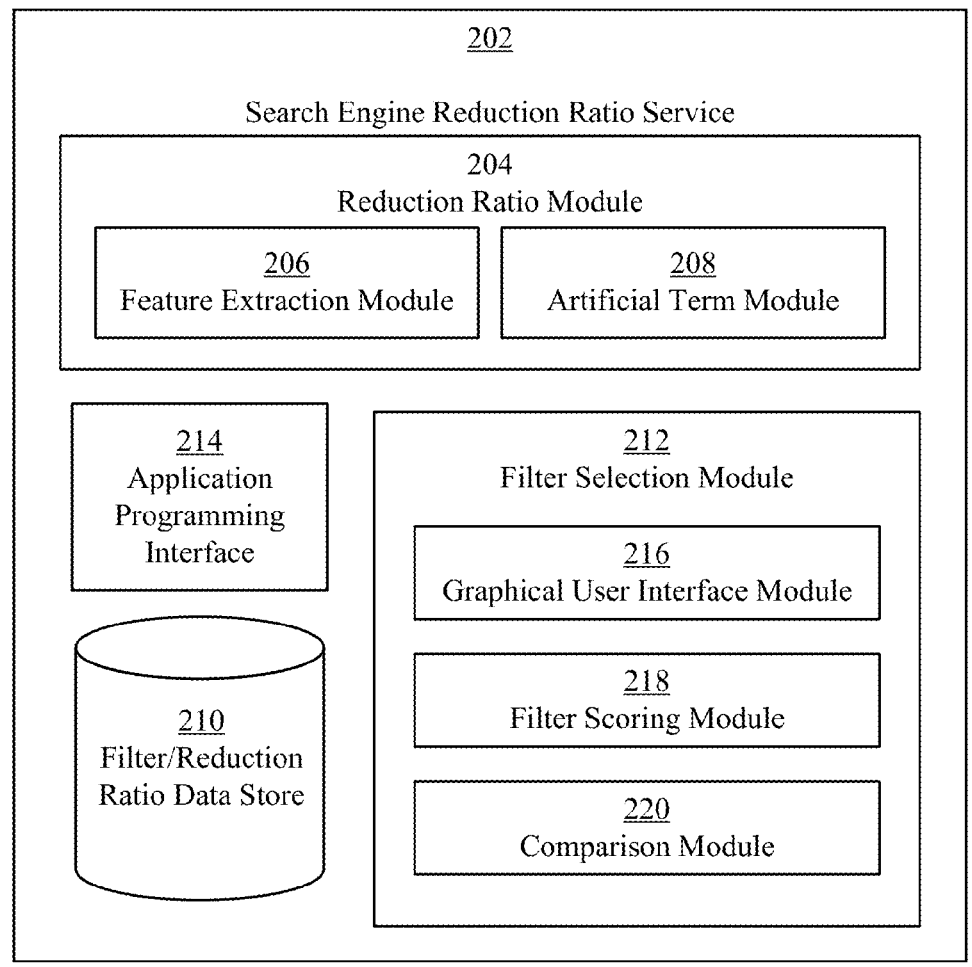
FIG. 2 is a schematic illustrating an example computer architecture for the search engine reduction ratio service including a plurality of modules that may carry out various embodiments.

FIG. 2 is a schematic illustrating an example computer architecture 200 for the search engine reduction ratio service 202 (e.g., the search engine reduction ratio service 22, FIG. 1) including a plurality of modules that may carry out various embodiments. The modules 204-220 may be software modules, hardware modules, or a combination thereof. If the modules 204-220 are software modules, the modules 204-220 can be embodied on a computer readable medium and processed by a processor in any of the computer systems described herein. It should be noted that any module or data store described herein, may be, in some embodiments, a service responsible for managing data of the type required to make corresponding calculations. The modules may be configured in the manner suggested in FIG. 2 or may exist as separate modules or services external to the search engine reduction ratio service 202.

In accordance with at least one embodiment, a method is enabled for training and selecting one or more filters that when applied to a set of searchable media assets results in a reduced number of a searchable media assets according to a requested reduction ratio. For example, the search engine reduction ratio service 202 may include a reduction ratio module 204. The reduction ratio module 204 may also include a feature extraction module 206 and an artificial term module 208. The feature extraction module 206 may be responsible for analyzing a training asset and extracting features that may be utilized by the artificial term module 208. In accordance with at least one embodiment, the feature extraction module 206 may extract features from an image, such as color information, to form a color histogram from which dominant colors associated with the image may be identified.

In accordance with at least one embodiment, the artificial term module 208 may communicate with the feature extraction module 206 to form an artificial term based on the dominant colors and assign the created artificial term to the particular training asset. In some embodiments, more than one artificial term may be created based on the dominant colors identified during the feature extraction. Artificial terms can be created for one or more of the training assets in the set of training assets. In accordance with at least one embodiment, the reduction ratio module 204 may communicate with the artificial term module 208 and the filter/reduction ratio data store 210 to calculate a reduction ratio for the created artificial term. In one example, the reduction ratio module 204 may filter a set of training assets by the artificial term to determine a filter reduction ratio where the filter reduction ratio represents a count of the frequency of inclusion of the artificial term in the set of training assets. In an example, the reduction ratio module 204 may communicate with an external or third party data store/database such as database 50, FIG. 1, to access the set of one or more training assets. The search engine reduction ratio service 202 may perform the above-described operations for each particular asset in the set of training assets to create a plurality of filters which may be further utilized by the filter selection module 212 to reduce the number of searchable media assets according to a requested reduction ratio.

In accordance with at least one embodiment, the feature extraction module 206 may extract features from an image, or other media asset, to create a set of hash terms. In an embodiment, hash terms may be utilized in alternative to artificial terms. The hash terms may be utilized as filters similar to the artificial terms. For example, a set of training assets may be filtered by the created hash terms and a reduction ratio assigned based on a count of inclusion of assets containing a certain proportion of the filtered for hash terms. In accordance with at least one embodiment, hash terms may be appropriate for certain search assets, such as audio files or audio media related files.

In an example, the feature extraction module 206 may analyze an image-training asset, extract color information and create a color histogram based on the image. In another example, the feature extraction module 206 may analyze an audio file training asset, extract frequency information, and create a frequency histogram based on the audio file. In accordance with at least one embodiment, the artificial term module 208 may analyze the histogram associated with the image or audio file to create one or more hash terms which may represent the dominant colors or dominant audio frequencies present in the training asset. In accordance with at least one embodiment, the frequency histogram based on the audio file may be utilized to create a pair of corresponding data points: a dominant frequency and a time point that is offset from the beginning of the audio file. The set of training assets may then be filtered by the pairs of corresponding data points to determine a reduction ratio utilizing audio file training assets.

In accordance with at least one embodiment, the reduction ratio module 204 may filter the set of one or more training assets by the one or more hash terms created using the artificial term module 208 to calculate a reduction ratio. In an example, the reduction ratio calculated by the reduction ratio module 204 represents the proportion of training assets that contain a specified proportion of the created one or more hash terms compared to the proportion of training assets that do not contain the specified proportion of the created one or more hash terms. In an example, an administrator or user of the service may specify or define the proportion of one or more hash terms required for calculation of the reduction ratio.

The reduction ratio module 204 may communicate with an external or third party data store/database such as database 50, FIG. 1, to access the set of one or more training assets.

The search engine reduction ratio service 202 may perform the above described operations for each particular asset in the set of one or more training assets to create a plurality of filters which may be further utilized by the filter selection module 212 to reduce a number of searchable media assets according to a requested reduction ratio.

In accordance with at least one embodiment, the reduction ratio module 204 communicates with the filter selection module 212 when a requested reduction ratio is received from a graphical user interface 18 or web browser 12, FIG. 1. The search engine reduction ratio service 202 may receive the requested reduction ratio with the aid of an application-programming interface (API) 214 and a graphical user interface module 216 in communication with a client device 10, FIG. 1. In accordance with at least one embodiment, the reduction ratio may be received through an API function call handled by API 214. In accordance with at least one embodiment, a filter scoring module 218 may be responsible for calculating a score for combined sets of filters created by the reduction ratio module 204.

In one example, the filter selection module 212 can utilize a brute force algorithm to combine different filters and calculate the reduction ratio for various combinations of all available filters. In accordance with at least one embodiment, the filter selection module 212 can utilize Boolean operations to combine different filters and calculate the reduction ratio associated with said combination. In one example, the filter selection module 212 may utilize a hierarchical filter combination algorithm. The filter selection module 212 can in some embodiments utilize any suitable algorithm for independent combinations of filters.

In accordance with at least one embodiment, the filter selection module 212 can be constrained by the exclusion of certain filters according to the determination of the comparison module 220. The comparison module 220 may be responsible for comparing the potential combined filters for potentially undesirable overlapping filter coverage. For example, suppose the set of one or more training assets is comprised of image media files. The reduction ratio module 204 has created a set of filters by utilizing artificial terms created by the artificial term module 208 after feature extraction by the feature extraction module 206. Still further, if two or more artificial term filters share the same or similar amount of dominant color frequency according to their associated histograms, the comparison module 220 may exclude them from inclusion in the combination of filters to be selected by the filter selection module 212. The amount of overlap, or the overlap threshold allowed before exclusion can be set by the administrator or user of the service or it may be predetermined at configuration of the server in some embodiments.

In some examples, the filter scoring module 218 calculates a score, the score representing the similarity of the combined filters ratio to that of the received requested reduction ratio. As described above, the combined ratios that are closer numerically to the requested reduction ratio may receive a better score than those that are further numerically from the requested reduction ratio.

In accordance with at least one embodiment, the search engine reduction ratio service 202 may utilize modules 204-220 to dynamically determine a combination of filters and their associated reduction ratio, to reduce a searchable set of assets to a reduced or meaningful set of searchable assets. The search engine reduction ratio service 202 via the API 214 and/or the graphical user interface module 216 may apply the selected filters to a set of searchable media assets and display the result to a user via a client device 10 configured with a browser/plugin 12 via communication across networks 5.

Figure 3:
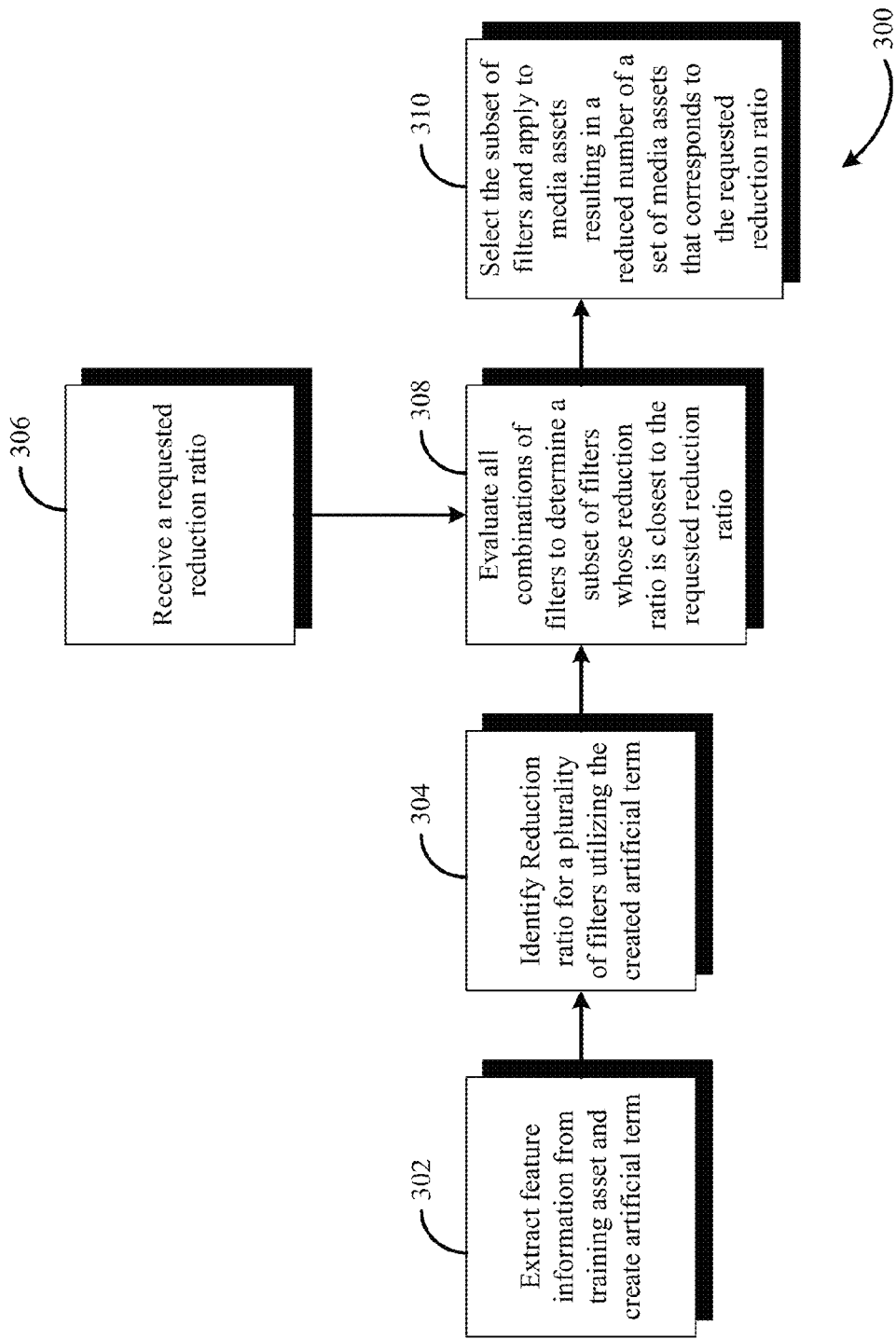
FIG. 3 is a flow chart illustrating an exemplary method for utilizing the search engine reduction ratio service, in accordance with at least one embodiment.

FIG. 3 is a flow chart illustrating an exemplary method 300 for utilizing a search engine reduction ratio service (e.g., the search engine reduction ratio service 202, FIG. 2), in accordance with at least one embodiment. In a similar manner as discussed above, feature information, such as color information from an image, can be extracted from a training asset of a set of one or more training assets and utilized to create an artificial term at 302. In accordance with at least one embodiment, the feature extraction module 206, and artificial term module 208, FIG. 2, can carry out the operations described in 302.

At 304, a reduction ratio can be calculated by filtering the set of one or more training assets by the created artificial term and assigning the reduction ratio to the artificial term as discussed above. In accordance with at least one embodiment, the operations described in 304 can be performed by the reduction ratio module 204 in communication with the filter/reduction ratio data store 210 or a third party database 50, FIG. 2 and FIG. 1, respectively. In an example, operations 302 and 304 can be repeated for the entire set of one or more training assets effectively creating a plurality of filters with varying reduction ratios. In accordance with one embodiment and as discussed above, the artificial term/filter may include information about dominant colors associated with a particular image (the training asset in the current case) derived from a color histogram derived from the extracted features. One or more suitable training algorithms may be utilized during the operations 302 and 304 to properly identify the reduction ratio associated with each artificial term filter.

At 306, the service may receive a requested reduction ratio. In accordance with at least one embodiment, the requested reduction ratio may be submitted by a search engine administrator utilizing a computing device such as client device 10 and communicated via networks 5 to the search engine reduction ratio service 202, FIG. 1 and FIG. 2, respectively. In one example, the search engine administrator may submit or communicate the requested reduction ratio to the search engine reduction ratio service 202 by utilizing a GUI configured to run on a web browser or a separate stand-alone application configured to run on any suitable computing device or mobile device. The search engine reduction ratio service 202 may also utilize the API 214 and GUI module 216 to receive the requested reduction ratio. In accordance with at least one embodiment, the requested reduction ratio can be comprised of numeric characters.

At 308, the service may continue the operation by evaluating possible combinations of filters to determine a subset of filters to apply to a set of searchable media assets that would result in a reduced number of a set of searchable assets correlating to the requested reduction ratio. In accordance with at least one embodiment, the operations described at 308 may be performed by the filter selection module 212, the filter scoring module 218, and the comparison module 220, FIG. 2. In an example, and as described above, the service may utilize a brute force algorithm to identify the subset of filters to apply to the set of searchable media assets. Continuing the example, the possible combinations of filters may be restrained by an overlap threshold, as described above with reference to the comparison module 220. For example, if the training assets are comprised of images, two or more filters may share the same or similar amount of dominant color frequency according to their associated histograms. The comparison module 220 may exclude the similar filters from inclusion in the combination of filters to be selected by the filter selection module 212. The amount of overlap, or the overlap threshold allowed before exclusion, can be set by the administrator or user of the service or it may be predetermined at configuration of the server in some embodiments.

In accordance with at least one embodiment, a subset of filters are selected and applied to a set of searchable media assets that results in a reduced number of searchable media assets that may be utilized by a user or search engine participant at 310. In an example, the filter scoring module 218 may assign a score to each combination of filters, with higher scores being assigned to reduction ratios that are numerically closer to the requested reduction ratio. Continuing the example, the filter selection module 212 can dynamically choose the best fit combination of filters to apply to the set of searchable media assets to fulfill a search engine administrator's request to reduce the searchable set according to a requested ratio. In some examples, if multiple combinations of filters produce the closest fit reduction ratio, the search environment of a particular search engine may provide a determination of which particular combination may be selected and applied. For example, a search engine environment may perform a round robin selection of filters for each new search performed or utilize a random selection of the subset of filters to apply.

Figure 4:
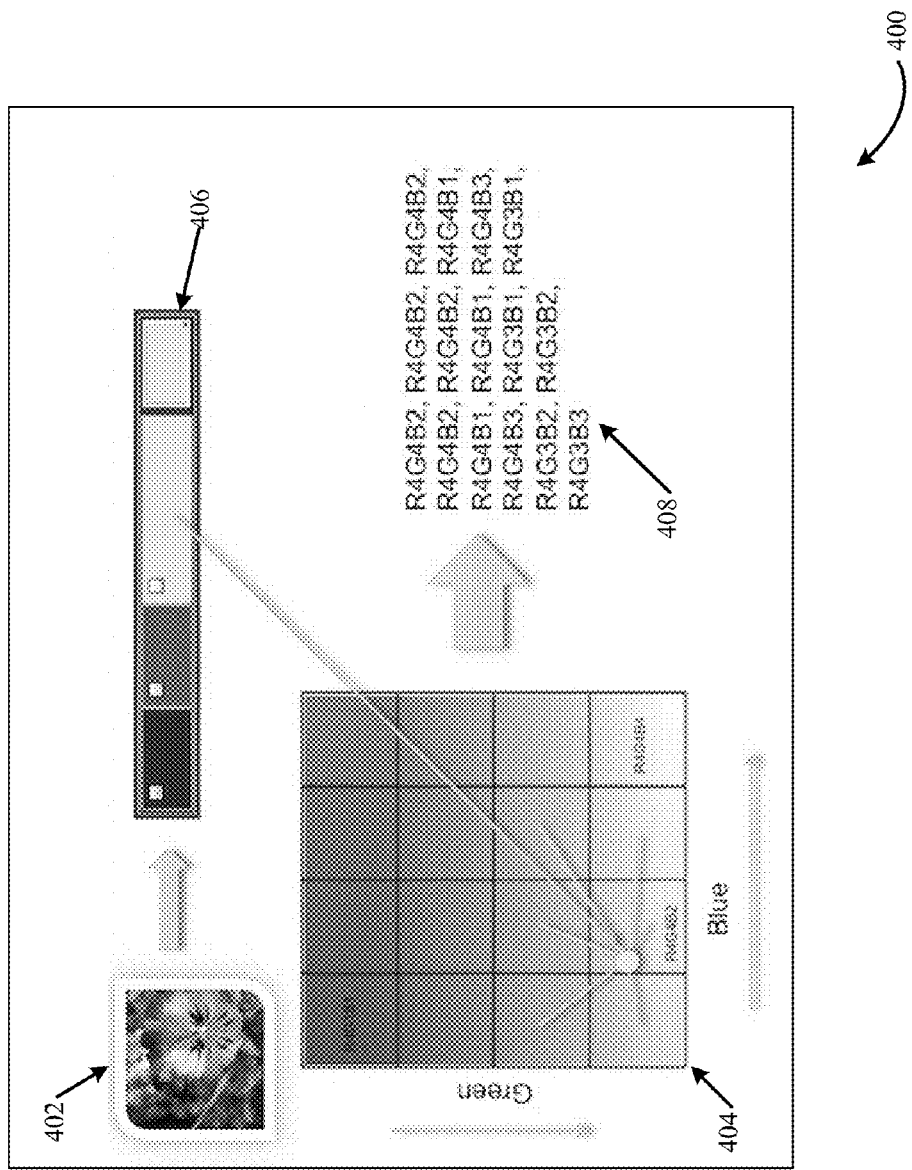
FIG. 4 is a diagram depicting an exemplary artificial term creation from a color image, in accordance with at least one embodiment.

FIG. 4 is diagram 400 depicting an exemplary artificial term creation from a color image, in accordance with at least one embodiment. The diagram 400 includes an example training asset, in this case an image at 402. It should be noted that, as described above, training assets can include images, audio files, movie files, or text files. In accordance with at least one embodiment, feature information can be extracted from the image 402. In the current example, some of the colors identified in image 402 can be displayed in a Red, Green, and Blue (RGB) color space spectrum 404. In an example, any suitable color space spectrum such as a Lab color space (LAB or lightness/chroma color space) may be utilized in determining dominant colors included within a training image asset. An example of dominant colors found at a particular location in the RGB color space can be seen at 406 which includes 4 identified dominant colors. The 4 identified dominant colors at 406 may be utilized to create an artificial term.

In accordance with at least one embodiment, the extracted feature information of image 402 can be utilized to create an artificial term from dominant colors present in the image such as the dominant colors 406. Examples of artificial terms that can be created from dominant color identification are seen at 408. In an example, the artificial term depicted at 408 is defined in terms of RGB values that represent the dominant colors found in the image. It should be noted that any alpha-numeric string can be utilized to represent the artificial term and the present depiction of the artificial term in terms of an RGB value is only for explanatory purposes. The extracting of the feature information or color information 404 and 406 can be performed by the feature extraction module 206 and the artificial term creation 408 can be handled by the artificial term module 208, FIG. 2, as described above in accordance with at least one embodiment. In an example, multiple training asset images such as 402 are analyzed to create multiple artificial terms which will later be used to filter the entire set of training assets to identify reduction ratios that are assigned to the filters created by the artificial term.

Figure 5A:
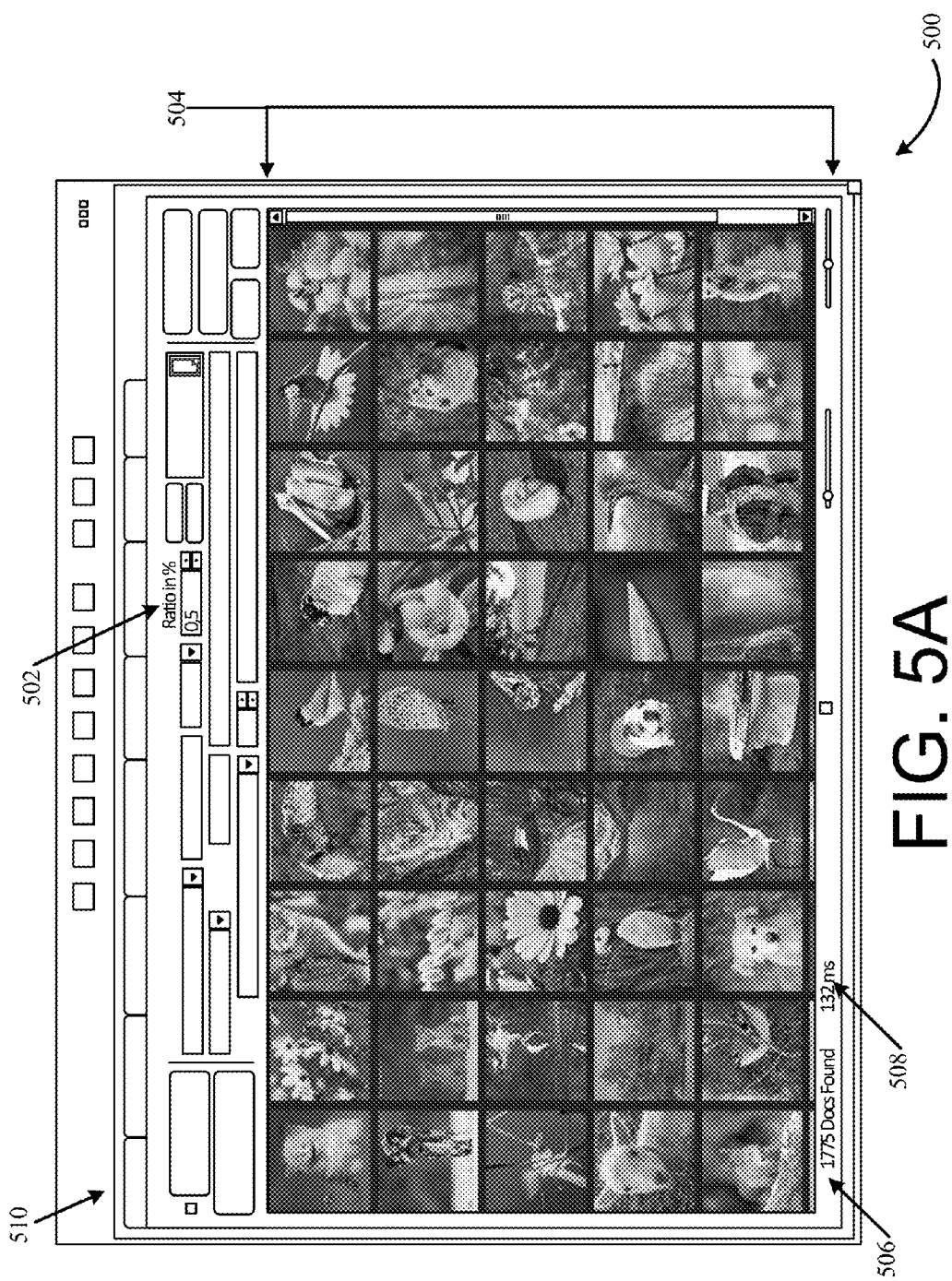
FIG. 5A is a diagram depicting an exemplary search result set with an applied reduction ratio, in accordance with at least one embodiment.

FIG. 5A is a diagram depicting an exemplary search result set 500 with an applied reduction ratio (shown here in a percentage reduction), in accordance with at least one embodiment. The example search query result set 500 includes a plurality of images 504. It should be noted, the search query result set 500 can include any searchable asset as described above. In accordance with at least one embodiment, the search query result set 500 displays a requested reduction ratio 502, the number of documents found 506 utilizing the reduction ratio 502, and the time it took to complete the search query 508 utilizing the requested reduction ratio 502. In an embodiment, the search query result set can be displayed via a GUI as shown in FIG. 5A at 510. In one embodiment, the search query result set 500 can be displayed via a web browser such as browser 12. In accordance with at least one embodiment, an administrator or other user can set the reduction ratio 502 utilizing the GUI 510 or utilizing an independent application via any suitable computing device. As described further below with reference to FIG. 5B, changing the reduction ratio will reduce the number of results in a search query result set. In accordance with at least one embodiment, the more stringent the reduction ratio the less time it can take to find individual assets which satisfy the stringency of the reduction ratio. In accordance with at least one embodiment and as described above with reference to FIG. 2, modules 202, and 210-220 may be utilized to receive a requested reduction ratio, determine the appropriate amount of filters to apply to acquire the requested reduction ratio and apply the filters to a set of searchable assets to display the search result set 500.

Figure 5B:
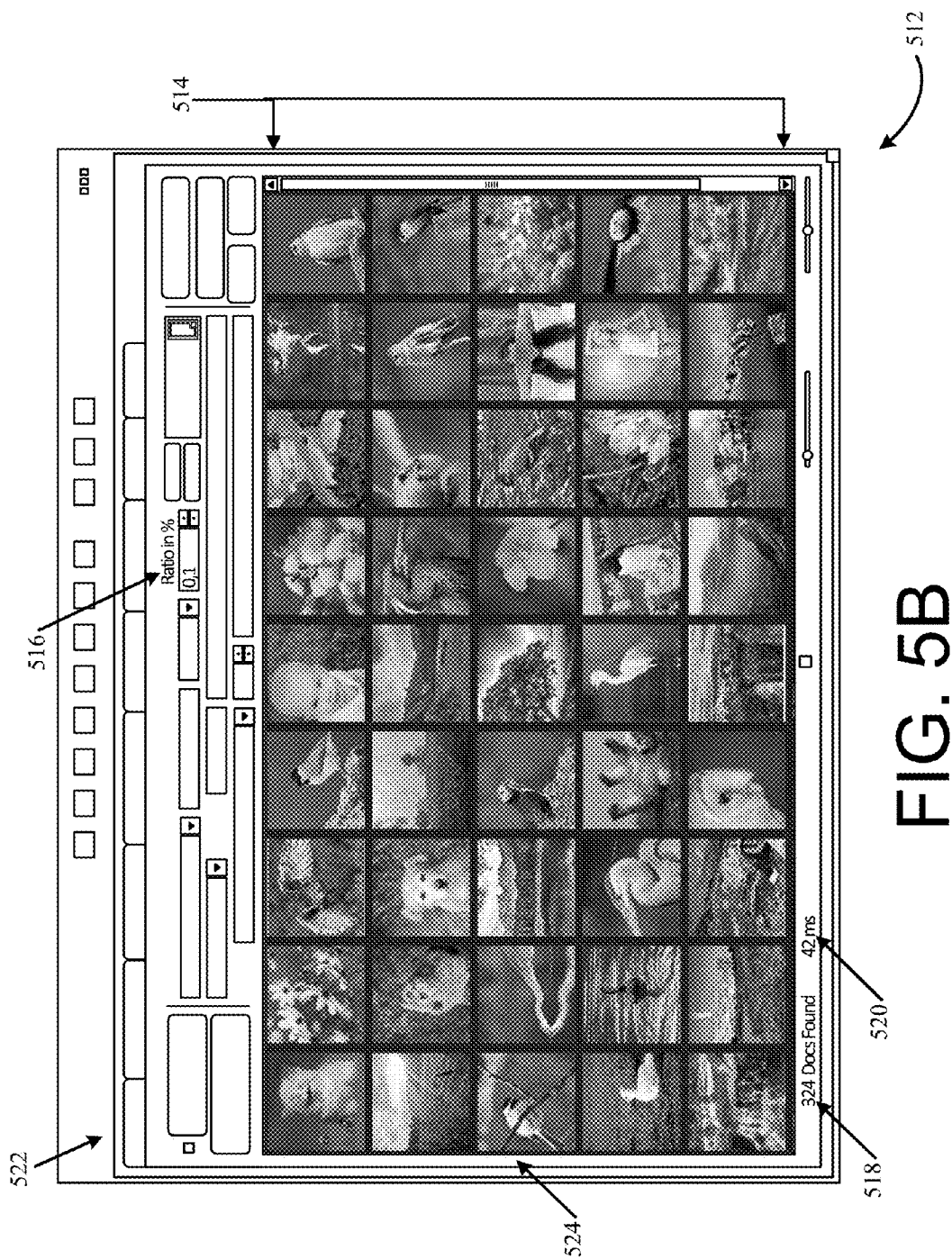
FIG. 5B is a diagram depicting an exemplary search result set with a different applied reduction ratio, in accordance with at least one embodiment.

FIG. 5B is a diagram depicting an exemplary search result with a different applied reduction ratio (shown here in a percentage reduction), in accordance with at least one embodiment. The example search query result set 512 includes a plurality of images 514. It should be noted, the search query result set 512 can include any searchable asset as described above. In accordance with at least one embodiment, the search query result set 512 displays a requested reduction ratio 516, the number of documents found 518 utilizing the reduction ratio 516, and the time it took to complete the search query 520 utilizing the requested reduction ratio 516. In an embodiment, the search query result set 512 can be displayed via a GUI as shown in FIG. 5B at 522. In one embodiment, the search query result set 512 can be displayed via a web browser such as browser 12. In accordance with at least one embodiment, an administrator or other user can set the reduction ratio 516 utilizing the GUI 522 or utilizing an independent application via any suitable computing device. As described above with reference to FIG. 5A, changing the reduction ratio 516 can result in a search query result set 512 that is smaller, as shown at 518 (compared to 506) as a result of a utilizing a more stringent reduction ratio. In accordance with at least one embodiment, the more stringent reduction ratio 516 has taken less time (520 as compared to 508) to find individual assets that satisfy the stringency of the reduction ratio. It should be noted that the plurality of images 514 included in FIG. 5B may be different from the plurality of images presented in FIG. 5A. In accordance with at least one embodiment, the difference in images displayed can be a result of the increased stringency of the reduction ratio 516. Therefore, images that may have been included in the result set of FIG. 5A may be excluded in FIG. 5B because of the filters applied to obtain the requested reduction ratio 516. In accordance with at least one embodiment and as described above with reference to FIG. 2, modules 202, and 210-220 may be utilized to receive a requested reduction ratio, determine the appropriate amount of filters to apply to acquire the requested reduction ratio and apply the filters to a set of searchable assets to display the search result set 512.

Figure 6:
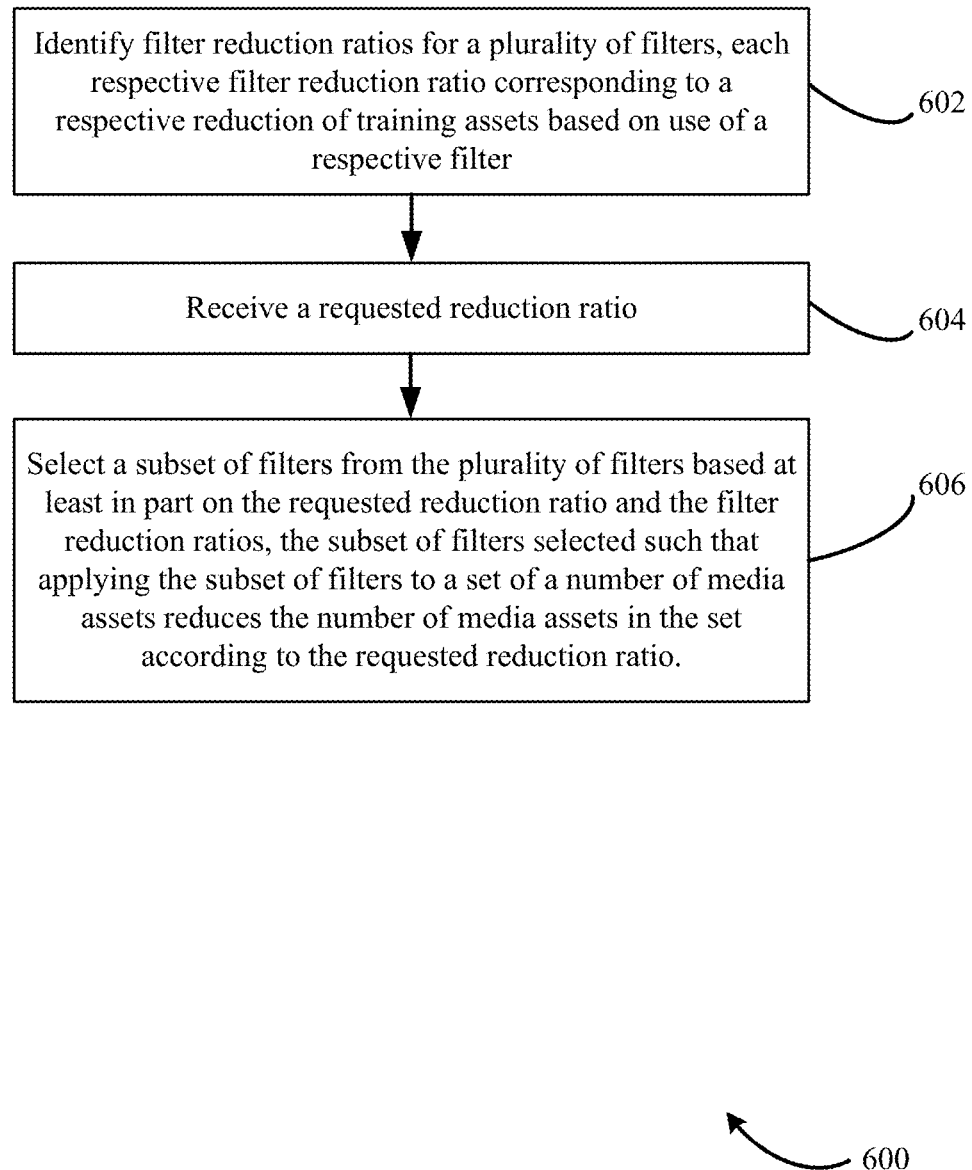
FIG. 6 is a block diagram depicting an exemplary method for applying a subset of filters with corresponding reduction ratios to reduce the number of media asset search results in accordance with at least one embodiment.

FIG. 6 is a block diagram depicting an exemplary method 600 for applying a subset of filters with corresponding reduction ratios to reduce the size of media asset search results in accordance with at least one embodiment. The exemplary method 600 may be performed by any suitable computing device and/or application. For example, exemplary method 600 could be performed by search engine reduction ratio service 202, FIG. 2.

The exemplary method 600 may begin at block 602, with identifying reduction ratios for each of a plurality of filters associated with training assets. In accordance with at least one embodiment, the reduction ratios may be identified by feature extraction and artificial term creation performed by modules 202-208 as described above in FIGS. 2 and 3.

The exemplary method 600 may continue at block 604 by receiving a requested reduction ratio. In accordance with at least one embodiment, the requested reduction ratio can be received by the service 202 utilizing modules 212-216 as described above in FIGS. 2 and 3.

The exemplary method 600 may conclude at block 606 by selecting a subset of filters from the plurality of filters based at least in part on the requested reduction ratio such that applying the subset of filters to a set of a number of media assets reduces the number of media assets in the set according to the requested reduction ratio. In accordance with at least one embodiment, the selection and application of the subset of filters can be performed by modules 202, 210, 212, 218, and 220 as described above with reference to FIGS. 2 and 3.

System Implementation

As discussed above, FIG. 1 is a block diagram depicting exemplary computing devices 10 and 20 in an exemplary computing environment 100 for implementing certain embodiments. Applications and other electronic content execute or are otherwise used on the exemplary computer devices 10 and 20, and are shown as functional components or modules. As is known to one of skill in the art, such applications and content may be resident in any suitable computer-readable medium and execute on any suitable processor. As examples, as shown the client device 10 comprises a computer-readable medium such as a random access memory (RAM) 11 coupled to a processor 15 that executes computer-executable program instructions and/or accesses information stored in memory 11. The processor 15 may comprise a microprocessor, an ASIC, a state machine, or other processor, and can be any of a number of computer processors. Such a processor 15 can comprise, or may be in communication with a computer-readable medium which stores instructions that, when executed by the processor, cause the processor to perform the steps described herein.

A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, and JavaScript. The instructions may be executed or otherwise used to provide one or more of the features described herein.

The client device 10 may also comprise a number of external or internal devices such as a mouse, a CD-ROM, DVD, a keyboard, a display, audio speakers, one or more microphones, or any other input or output devices. For example, device 10 is shown with a display 17 having a user interface 18 and various user interface devices 19. A bus 16 is included in the device 10. Device 10 could be a personal computing device, a mobile device, a server computer device, or any other type of electronic devices appropriate for providing one or more of the features described herein.

The network(s) 5 may include any one or a combination of many different types of networks, such as cable networks, the Internet, wireless networks, cellular networks and other private and/or public networks.

The server device 20 illustrated in FIG. 1 may be configured to itself or in combination with other server devices to provide filter creation and reduction ratio calculation and selection server functionality. The exemplary server device 20 comprises memory 21, a processor 23, and a bus 24, and may have a search engine reduction ratio application 22 stored in memory 21 that is executed by the processor 23 to provide the filter creation and reduction ratio calculation and selection server functionality. The search engine reduction ratio application 22 may expose API functions that are called by an application on client device 10 or browser/web browser 12 on client device 10.

The exemplary devices illustrated in FIG. 1 provide an example configuration in which the exemplary search engine reduction ratio service can be provided. Other configurations may be used with modifications, additions, and deletions to address the particular circumstances in which a particular system is used.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A computer-implemented method, comprising:
   identifying filter reduction ratios for a plurality of filters, each respective filter reduction ratio corresponding to a respective reduction of training assets based on use of a respective filter, wherein identifying a filter reduction ratio for a filter of the plurality of filters comprises:
      creating an artificial term for the filter based on color information;
      filtering the training assets using the created artificial term; and
      calculating the filter reduction ratio for the filter based at least in part on the filtered training assets and the training assets;
   receiving a requested reduction ratio; and
   selecting, by a computing system, a subset of filters from the plurality of filters based at least in part on the requested reduction ratio and the filter reduction ratios, the subset of filters selected such that applying the subset of filters to a set of a number of media assets reduces the number of media assets in the set according to the requested reduction ratio.

2. The computer-implemented method of claim 1, wherein identifying a filter reduction ratio for a filter of the plurality of filters comprises:
   creating an artificial term by identifying a weighted palette of colors in a color histogram based on color information of an image, the artificial term representing a dominant color of the weighted palette of colors;
   filtering the training assets using the created artificial term; and
   calculating the filter reduction ratio for the filter based at least in part on the filtered training assets and the training assets.

3. The computer-implemented method of claim 1, wherein selecting the subset of filters further comprises:
   evaluating multiple combinations of the plurality of filters to identify a respective combined reduction ratio for each of the multiple combinations;
   assigning a score to each of the multiple combinations, each respective score representing a correlation between the respective combined reduction ratio of each combination and the requested reduction ratio; and
   selecting a combination of the multiple combinations based at least in part on the assigned score.

4. The computer-implemented method of claim 1, wherein selecting the subset of filters further comprises evaluating multiple combinations of the plurality of filters utilizing one or more Boolean operations to identify a respective combined reduction ratio for each of the multiple combinations.

5. The computer-implemented method of claim 1, wherein selecting the subset of filters further comprises evaluating multiple combinations of the plurality of filters utilizing a hierarchical filter combination algorithm to identify a respective combined reduction ratio for each of the multiple combinations.

6. The computer-implemented method of claim 1, wherein selecting the subset of filters further comprises:
   evaluating multiple combinations of the plurality of filters; and
   selecting a combination of the multiple combinations based at least in part on an overlap threshold representing filter similarity.

7. The computer-implemented method of claim 1, wherein the media assets include at least one of an image file, an audio file, a text file, or a movie file.

8. The computer-implemented method of claim 1 further comprising receiving search query criteria, wherein the subset of filters is selected from the plurality of filters based at least in part on the search query criteria.

9. The computer-implemented method of claim 1 further comprising:
   receiving search query criteria comprising an image, wherein the subset of filters is selected from the plurality of filters based at least in part on the image.

10. The computer-implemented method of claim 1 further comprising providing the set of the number of media assets for display via a graphical user interface, wherein the graphical user interface is further configured to receive and communicate user preferences used to determine the requested reduction ratio.

11. A system, comprising:
   one or more processors; and
   memory including instructions executable by the one or more processors that, when executed by the one or more processors, cause the system to at least:
   identify filter reduction ratios for a plurality of filters, each respective filter reduction ratio corresponding to a respective reduction of training assets based on use of a respective filter, by executing further instructions that cause the system to:
      create an artificial term for the filter based on color information;
      filter the training assets using the created artificial term; and
      calculate the filter reduction ratio for the filter based at least in part on the filtered training assets and the training assets; and
   in response to receiving a requested reduction ratio:
   select a subset of filters from the plurality of filters based at least in part on the requested reduction ratio and the filter reduction ratios, the subset of filters selected such that applying the subset of filters to a set of a number of media assets reduces the number of media assets in the set according to the requested reduction ratio.

12. The system of claim 11, wherein the instructions cause the system to identify a reduction ratio for a filter by:
   creating a hash term based on extracted feature information, wherein the hash term corresponds to the filter and is comprised of data of a fixed length;
   filtering the training assets using the hash term; and
   calculating the reduction ratio for the filter based at least in part on the filtered training assets and the training assets.

13. The system of claim 11, wherein the instructions cause the system to identify a reduction ratio for a filter by:
   creating a histogram based on extracted feature information;
   identifying at least one hash term in the histogram;
   filtering the training assets using the at least one hash term; and
   calculating the reduction ratio for the filter based at least in part on the filtered training assets and the training assets.

14. The system of claim 11, wherein the instructions cause the system to identify a reduction ratio for a filter by:
   extracting frequency information from each training asset of the training assets;
   creating a frequency histogram based on the extracted frequency information;
   creating hash terms based on the frequency histogram;
   filtering the training assets by the created hash terms; and
   calculating the reduction ratio based at least in part on the filtered training assets and the training assets, wherein the filtered training assets are comprised of a subset of the training assets that include a similar proportion of hash terms as the created hash terms.

15. The system of claim 11, further comprising:
   a user-interface configured to receive instructions that identify a reduction ratio.

16. A non-transitory computer-readable storage medium having stored thereon computer-executable instructions that, when executed by one or more processors of a computer system, cause the computer system to perform operations comprising:
   identifying reduction ratios for each of a plurality of filters, wherein identifying the reduction ratios for each of the plurality of filters comprises:
      creating an artificial term for the filter based on color information;
      filtering training assets using the created artificial term; and
      calculating the reduction ratio for a particular filter of the plurality of filters based at least in part on the filtered training assets and the training assets; and
   selecting a subset of filters from the plurality of filters based at least in part on a particular reduction ratio such that applying the subset of filters to a set of a number of media assets reduces the number of media assets in the set according to the particular reduction ratio.

17. The non-transitory computer readable storage medium of claim 16 wherein creating the artificial term includes analyzing an image for the color information.

* * * * *